No. 628,138. Patented July 4, 1899.
W. J. BUSSE.
BALL BEARING FOR CYCLES.
(Application filed July 2, 1898.)
(No Model.)
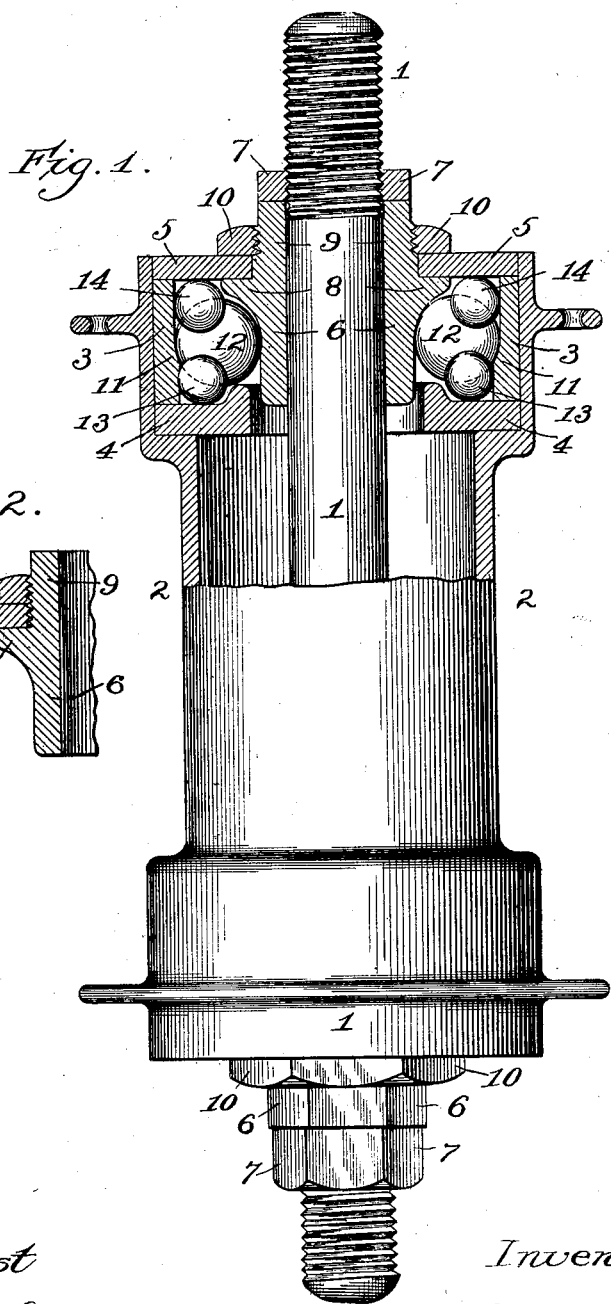
Attest
Harry B. White
J. B. Weir
Inventor
William J. Busse,
By Robert Burns Atty.

United States Patent Office.

WILLIAM J. BUSSE, OF CHICAGO, ILLINOIS.

BALL-BEARING FOR CYCLES.

SPECIFICATION forming part of Letters Patent No. 628,138, dated July 4, 1899.

Application filed July 2, 1898. Serial No. 685,062. (No model.)

*To all whom it may concern:*

Be it known that I, WILLIAM J. BUSSE, a citizen of the United States of America, and a resident of Chicago, in the county of Cook and State of Illinois, have invented certain new and useful Improvements in Ball-Bearings for Cycles, of which the following is a specification.

This invention relates to certain improvements in ball-bearings for cycles, &c., that form the subject-matter of my prior patent, No. 567,732, dated September 15, 1896.

The object of the present improvement is to provide a simple and efficient construction and arrangement of the bearing parts in which excessive end thrust upon the inner series of small spacing-balls is prevented and with which an accurate adjustment to take up for wear can be readily and effectively attained, as will hereinafter more fully appear and be more particularly pointed out in the claims. I attain such object by the construction of parts illustrated in the accompanying drawings, in which—

Figure 1 is an enlarged elevation, partly sectionized, illustrating the present invention; Fig. 2, an enlarged detail sectional elevation of a modification.

Similar numerals of reference indicate like parts in both views.

Referring to the drawings, 1 represents the axle, and 2 the hub or shell, provided at each end with the usual enlarged cavity, in which is arranged the annular lining or bearing-sleeve 3, that constitutes an internal circular track or ball-race for the travel of the series of bearing-balls, as shown, and the inner and outer bearing-disks 4 and 5, as shown, the sleeve 3 and inner disk 4 being of a stationary nature within the hub, while the outer bearing-disk 5 is adapted to have a limited endwise adjustment to take up wear, lost-motion, &c.

In Fig. 1 of the drawings the adjustable bearing-disk 5 is shown at the limit of its inward adjustment and in contact with the adjacent end of the sleeve 3. Further inward adjustment may be readily had when required by slightly grinding away the adjacent end of said sleeve by rubbing the same upon a grinding-surface, such as emery cloth, &c.

6 represents the tubular bearing-cone, the central bore of which fits the axle to guide the cone in its longitudinal adjustment thereon, 7 being a nut screwing upon the screw-threaded outer end of the axle to effect such adjustment.

The bearing cone or collar 6 is formed with an inner coned portion, an intermediate collar portion 8 forming the base of such coned portion, and an outer cylindrical portion 9, screw-threaded to receive a binding-nut 10, by which the outer bearing-disk 5 is held against the outer face of the collar portion 8 of the bearing-cone. The bore of said bearing-disk may be screw-threaded, so as to screw upon the screw-threaded cylindrical outer portion 9 of the bearing-cone, so as to have a lock-nut effect in connection with the binding-nut 10, as illustrated in Fig. 2, or said bore may be smooth and merely encompass said cylindrical outer portion 9 of the bearing-cone.

In the present improvement the bearing-sleeve 3 is counterbored from its outer end to form an annular offset or shoulder 11, that constitutes a bearing-abutment for the main series of larger balls of the bearing to receive the end thrust of the same and prevent longitudinal shifting of the parts.

The arrangement of the bearing-balls will be substantially the same as in my former patented construction and will comprise a series of larger main bearing-balls 12, arranged medianly of the bearing-sleeve 3 and engaging against the abutment 11 thereof, and two counterpart series of intermediate or auxiliary balls 13 and 14, smaller in size than the main balls, and arranged at each side and between the series of main balls, as shown, and adapted to space or hold the main series of balls in separated relation.

Having thus fully described my said invention, what I claim as new, and desire to secure by Letters Patent, is—

1. A ball-bearing for cycles, comprising in combination, a hub having an enlarged bearing-cavity for the balls, and provided with a bearing sleeve or lining, an inner bearing-disk and an outer bearing-disk, the bearing-sleeve and inner and outer bearing-disks, being of the same diameter as that of the enlarged cavity in the hub, an axle, a bearing-cone formed with a shouldered cylindrical outer extension carrying the outer bearing-disk, a confining-nut screwing upon said extension, a confining-nut screwing upon the axle, a central main series of bearing-balls, and outer and inner series of auxiliary spacing-balls, the bearing-cone in its movement effecting an adjustment of the main bearing-balls and the inner series of spacing-balls and the outer bearing-disk having movement independent of the cone to effect an adjustment of the outer series of spacing-balls, substantially as set forth.

2. A ball-bearing for cycles, comprising in combination, a hub having an enlarged bearing-cavity for the balls, a bearing-sleeve arranged therein and provided with a counterbore for forming an annular bearing-shoulder, a bearing-cone, a central main series of bearing-balls, having bearing on the bearing-sleeve, and outer and inner series of auxiliary spacing-balls, substantially as herein described.

In testimony whereof witness my hand this 29th day of June, 1898.

WILLIAM J. BUSSE.

In presence of—
ROBERT BURNS,
GEORGE LECHNER.